US011052514B2

(12) United States Patent
Engeron

(10) Patent No.: US 11,052,514 B2
(45) Date of Patent: Jul. 6, 2021

(54) METHOD AND APPARATUS FOR SECURING OBJECTS TO A WORK SURFACE

(71) Applicant: Michael G. Engeron, Houma, LA (US)

(72) Inventor: Michael G. Engeron, Houma, LA (US)

( * ) Notice: Subject to any disclaimer, the term of this patent is extended or adjusted under 35 U.S.C. 154(b) by 0 days.

(21) Appl. No.: 17/172,617

(22) Filed: Feb. 10, 2021

(65) Prior Publication Data

US 2021/0162568 A1 Jun. 3, 2021

Related U.S. Application Data

(63) Continuation of application No. 16/424,823, filed on May 29, 2019, now Pat. No. 10,940,575.

(60) Provisional application No. 62/678,652, filed on May 31, 2018.

(51) Int. Cl.

| | |
|---|---|
| ***B23Q 3/06*** | (2006.01) |
| ***B25B 5/16*** | (2006.01) |
| ***B25B 5/02*** | (2006.01) |

(52) U.S. Cl.
CPC . *B25B 5/16* (2013.01); *B25B 5/02* (2013.01)

(58) Field of Classification Search
CPC .. B25B 3/00; B25B 5/00; B25B 5/067; B25B 5/082; B25B 5/101; B25B 5/125; B23Q 3/06; B23Q 3/066
See application file for complete search history.

(56) References Cited

U.S. PATENT DOCUMENTS 10,940,575 B2 * 3/2021 Engeron .................. B25B 5/16
2019/0366515 A1 * 12/2019 Engeron ................ B25B 5/102

* cited by examiner

*Primary Examiner* — Lee D Wilson
(74) *Attorney, Agent, or Firm* — Ted M. Anthony

(57) ABSTRACT

An adjustable clamping assembly for securing an object (such as, for example, a board or other workpiece) to a work surface (such as, for example, a work bench or work table). A rigid rod member has a bent base section, as well as a clamping shoulder surface disposed at its distal end. A clamping head is slidably disposed along a portion of the length of the rigid rod member, and can be selectively secured in a place.

18 Claims, 9 Drawing Sheets

METHOD AND APPARATUS FOR SECURING OBJECTS TO A WORK SURFACE

CROSS REFERENCES TO RELATED APPLICATIONS

THIS APPLICATION IS A CONTINUATION AND CLAIMS PRIORITY OF U.S. patent application Ser. No. 16/424,823, FILED May 29, 2019, CURRENTLY PENDING, WHICH CLAIMS PRIORITY OF U.S. PROVISIONAL PATENT APPLICATION Ser. No. 62/678,652, FILED May 31, 2018, ALL INCORPORATED HEREIN BY REFERENCE.

STATEMENTS AS TO THE RIGHTS TO THE INVENTION MADE UNDER FEDERALLY SPONSORED RESEARCH AND DEVELOPMENT

NONE

FIELD OF THE INVENTION

The present invention pertains to a clamp assembly for selectively securing an object to a work surface. More particularly, the present invention pertains to a clamp assembly for securing a piece of wood or other workpiece to a work surface such as a work bench or table.

BACKGROUND OF THE INVENTION

Conventional clamping devices exist for securing a board or other object to the top of a workbench. One such device, which has been used by woodworkers for over 200 years, is a substantially "L-shaped" clamp comprising a central cylindrical post and a curved holding arm extending at or near the upper end of the central post in a substantially perpendicular or lateral orientation. A holding pad or foot is disposed at or near the outer or distal end of said holding arm.

During use, said central cylindrical post of the conventional clamping device is inserted through a hole (for example, a ¾" diameter hole, commonly referred to as a "doghole") in the upper surface of a workbench. A board or other object to be held (commonly referred to as a workpiece) is positioned under the holding pad, and the post is given a hard, solid blow with a mallet, hammer or other heavy object directly down onto the upper end of the post. The force of the blow drives said post further down through the doghole.

The holding pad, which has been placed against the top of the workpiece, is prevented from moving vertically by the workpiece. This discrepancy in the vertical movements (which can be 0.1" or more) between the rod and the holding pad causes the vertical rod to become slightly tilted or skewed in the doghole and, as a result, to be jammed with a frictional grip against the unprotected wooden inner surface of the doghole. Frequently, the round post has a rough outer surface that enhances the frictional grip between the post and doghole, but also contributes to frictional erosive wear from the unprotected inner wooden surface of the doghole. The diameter of the doghole increases from frictional wear with repeated use over time.

In order to release the workpiece from being secured by a conventional clamping device, the central post is struck with a blow laterally in a direction that is perpendicular to the long axis of said post. Such a forceful blow releases the frictional grip, thereby allowing the operator to manually manipulate the post, allowing removal of the post from the doghole. In order for the release of the frictional grip to occur, additional erosive wear to the inner surface of the doghole occurs.

Such conventional benchtop clamping devices depend on friction to secure a clamping device in a doghole. However, such conventional clamping devices produce frictional enlargement of a doghole during use. As a result, more expensive, harder, denser woods are favored for construction of workbenches, thereby frequently making quality workbenches unobtainable by many woodworkers. Woodworkers would benefit from having access to workbenches made from less expensive, more readily available materials. Further, such conventional clamping devices risk splitting the workbench top if forces are directed across the grain of the wooden workbench top.

Other conventional benchtop clamping devices have a threaded section of the vertical rod that extends down below the bottom of the benchtop during use, as well as a threaded nut. Such clamping devices require a user to hold and stabilize the vertical rod above the benchtop with one hand while locating the threaded end and screwing the nut onto the threaded part of the rod below the benchtop with the other hand. This is a very cumbersome and time consuming operation, especially when moving the clamping device from one doghole to another.

Although other materials could be used, such as aluminum or brass for less demanding applications, such conventional clamping devices are typically made from heavy duty ductile iron. Such conventional benchtop hold down clamping devices are not user friendly or versatile. Further, said conventional clamping devices will frequently come loose during use, especially if a doghole has been excessively enlarged over time. Thus, there is a need for a more effective, more user friendly, more versatile, clamping device and means that allows the use of less expensive and more available materials for constructing the workbench top.

SUMMARY OF THE INVENTION

The present invention generally comprises an adjustable clamping assembly for securing an object (such as, for example, a board or other workpiece) to a work surface (such as, for example, an upper surface of a work bench or work table). In a preferred embodiment, said clamping assembly of the present invention comprises a rigid central rod member. Said rod member has substantially linear cylindrical upper section and a substantially linear tapered lower section; a bent section is interposed between said upper section and said lower section.

Said bent section forms a single bend transition from the essentially straight cylindrical upper section and the essentially straight (and tapered) lower section. In a preferred embodiment, said bent section forms an angle of approximately 12 degrees from vertical. However, it is to be observed that said angle can be greater or lesser, depending on various design considerations including, without limitation, the thickness of a workbench top.

In a preferred embodiment, said upper section has a substantially cylindrical shape with a substantially constant outer diameter. An elongate groove or channel extends along a portion of said upper section and is aligned parallel with the longitudinal axis of said upper section. In a preferred embodiment, said groove has no superior lateral wall, leaving the upper end of the groove open to facilitate assembly and disassembly of the apparatus. The bottom end of said groove has a solid wall surface.

Said lower section has a tapered diameter—that is, the outer diameter of said lower section reduces in the direction of the distal end. In a preferred embodiment, said distal end of said tapered section has a semi-spherical/rounded lower surface, as well as an upwardly facing substantially flat shoulder surface. Said upwardly facing shoulder surface can have a demilune or substantially crescent shape.

A substantially planar support member is disposed at or slightly below said bent section of said rod member, and extends laterally outward from said rod member. Said support member has a non-abrasive cushion (such as rubber or plastic) pad attached to its underside. In a preferred embodiment, said support member is shaped so as to not completely encircle the outer surface of cylindrical rod, with its outer circumference forming an arc of approximately 180 degrees. Said planar support member is symmetrically attached, side to side, to the central rod.

A clamping member is slidably disposed along said upper section of said central rod. Said clamping member generally comprises a housing section, a lateral arm extension section, and a threaded bore disposed at or near the distal end of said arm extension section. Said housing has a central bore that slidably receives a portion of said cylindrical central rod. As such, it is to be observed that said clamping member can move along a portion of the length of said central rod, and can be selectively secured in desired positions along said central rod.

In a preferred embodiment, said clamping member can be selectively locked in place using at least one clutch plate. Each of said at least one clutch plates has a central bore, and is prevented from rotation within said housing by a plurality of projections or tongues that extend from the outer diameter of each clutch plate. A short tongue can protrude toward the rear of the housing through an opening in said housing wall, while a long tongue can protrude toward the front of the housing through an opposing opening in the housing wall. A spring biases said at least one clutch plate against said central rod, thereby forming a frictional grip against said central rod.

Said clamping member can be selectively secured along the length of the central rod by manually depressing said long tongue in order to overcome the force exerted by said bias spring, and releasing the at least one clutch plate from a frictional bind against said central rod. Said clamping member can then be selectively repositioned along the length of said central rod and secured in place by releasing said long tongue and permitting said spring to bias said at least one clutch plate, thereby causing the plate(s) to reengage with the central rod.

Said housing can further comprise at least one tooth that protrudes from said housing and is received into the groove in said cylindrical central rod; in a preferred embodiment, said housing has two teeth that are fixedly placed, one above and one below said at least one clutch plate. Said teeth function to keep the clamping member from rotating around the circumference of said central rod, and thereby maintaining the rotational orientation of the clamping member (including, without limitation, said housing and at least one clutch plate) relative to said central rod. An additional function of said at least one tooth is to limit the downward movement of the clamping member along the length of said central rod, by engaging the inferior wall of said groove as a travel stop.

Said cushioning pad can have substantially the same shape as the support member. This shape insures that, when the support member is symmetrically attached to said central rod, it will not interfere with the placement of a workpiece or risk damage to a workpiece. The cushioning pad, placed between the bottom of the support member and the top of the wooden workbench top, also serves to protect the workbench top from damage if the clamping mechanism is accidentally released and allowed to drop to the workbench top.

Said clamping member further comprises an arm extension section and threaded bore generally disposed at or near the distal end of said arm extension section. A threaded bolt member having an upper end and a lower end is threadedly disposed within said threaded bore. A handle member is disposed at or near said upper end, while a foot pad member is disposed at or near said lower end. Said foot pad member is at least partially constructed of non-abrasive material (such as, for example, plastic, rubber or other beneficial material), and is permitted to swivel about the longitudinal axis of said threaded bolt member.

Although other configurations can be envisioned without departing from the scope of the present invention, in a preferred embodiment, said threaded bore and threaded bolt member have matching ACME (coarse) threads that can engage with each other to selectively raise or lower bolt member (and attached foot pad member) relative to said threaded bore. Said threaded bolt travels in a direction that is generally parallel to the longitudinal axis of said rigid rod member.

In operation, a board or other workpiece can be selectively positioned on the upper surface of a workbench and within a desired distance from a doghole. The lower section of said rigid rod member is inserted through said doghole and manipulated until the upwardly facing demilune surface engages—in opposing relationship—against the underside of the work bench (or other fitting attached thereto). Because of bent section, and because of the taper of the lower section, said lower tapered section can be "skewed" or laterally displaced so that it is not in axial alignment with the longitudinal axis of said doghole, thereby allowing demilune surface to contact the underside of said workbench (or other fitting attached thereto). After manipulating the demilune surface in this manner, the upper section of rigid rod member will be positioned in an orientation that is substantially perpendicular to the planar upper surface of the workbench and parallel to the longitudinal axis of the doghole.

Said clamping member can be selectively positioned and secured in place at a desired vertical location along the length of upper section of the rigid rod member using the at least one clutch plate. Said threaded bolt can be rotated within said threaded bore by turning the thumbscrew, thereby causing said bolt to travel axially downward until the foot pad contacts said board or other workpiece. Said bolt can be selectively tightened until a desired amount of force (pressure) is applied to said board or other workpiece by said foot pad. In this manner, said board or other workpiece is secured against lateral movement or repositioning allowing a user to work on or otherwise manipulate said board or workpiece reliably, more quickly and with enhanced safety.

The present invention eliminates frictional gripping requirements of conventional clamping means and, as a result, eliminates erosive wear to the inner surface of the doghole. This further eliminates the need to use hard, dense, more expensive woods in construction of a workbench top and therefore promotes the use of more readily available, and less expensive, materials for use in workbenches. The thinner the workbench top, the greater the bend in said central rod in order to maintain said central rod in substantially perpendicular orientation to the workbench top during use. This is true when customizing the present invention for use with a benchtop of a particular thickness.

BRIEF DESCRIPTION OF THE DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
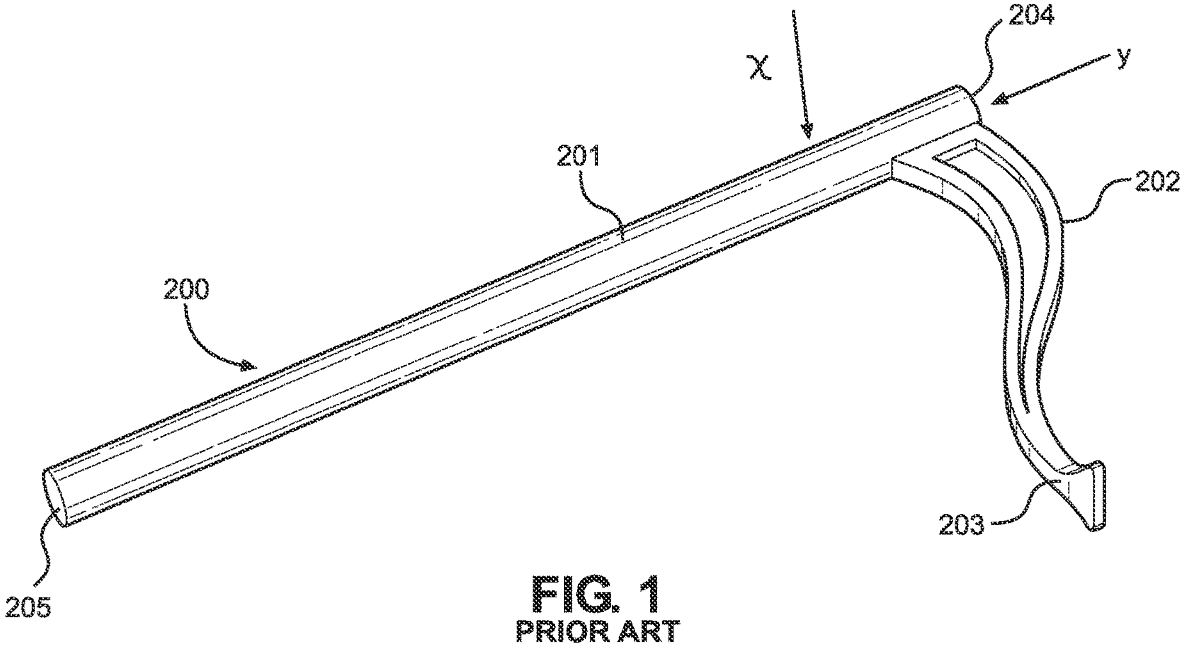
FIG. 1 PRIOR ART
FIG. 1 depicts a side perspective view of a conventional prior art clamp member.

FIG. 1 depicts a side perspective view of a conventional prior art clamp member 200. Said prior art clamp 200, or variations thereof, has been used by woodworkers for centuries. Generally, said clamp 200 forms a substantially "L shape," comprising central cylindrical post 201 having upper end 204 and lower end 205. Curved holding arm 202 extends laterally from post 201 at or near upper end 204 of central post 201 in substantially perpendicular orientation. Holding pad or foot 203 is disposed at or near the distal or outer end of said holding arm 202.

During use, lower end 205 of central cylindrical post 201 is inserted into a hole (for example, a ¾-inch diameter doghole) in a workbench top. A board or other object to be held (referred to herein as a workpiece) is positioned under holding pad 203. Upper end 204 of post 201 is then hit with a mallet, hammer or other heavy object, generally in direction "y" depicted on FIG. 1, thereby imparting force along the longitudinal axis of post 201. Such force acts to drive post 201 further down through said doghole.

In this configuration, holding pad 203 (which has been placed against a workpiece) is at least partially impeded or blocked from axial movement by said workpiece. The discrepancy in axial movement between post 201 and holding pad 203 (which can be 0.1" or more) causes post 201 to become slightly tilted or skewed within said doghole which, in turn, causes said post 201 to be jammed against the inner surface of said doghole, creating a frictional grip.

In order to release the workpiece from conventional clamping device 200, central post 201 is struck laterally, generally in direction "x" depicted on FIG. 1 (that is, generally perpendicular to the longitudinal axis of post 201). Such a forceful blow releases said frictional grip, thereby allowing an operator to manually manipulate post 201 within said doghole, and permitting removal of said post 201 from said doghole when desired.

In many instances, the inner surface of a doghole comprises unprotected wood, while the outer surface of post 201 can have a rough outer surface. While such a rough outer surface of said post 201 generally enhances frictional gripping between said post 201 and the inner surface of a doghole, it can also contribute to erosive wear of inner surface of said doghole (which is typically unprotected wood). As a result, the diameter of a doghole can increase from frictional wear with repeated use over time, eventually causing said doghole to become less effective for its intended purpose. Additionally, repeated lateral blows to post 201 (such as, for example, to loosen clamp member 200 from a doghole) can also increase the inner diameter of the doghole.

Figure 2:
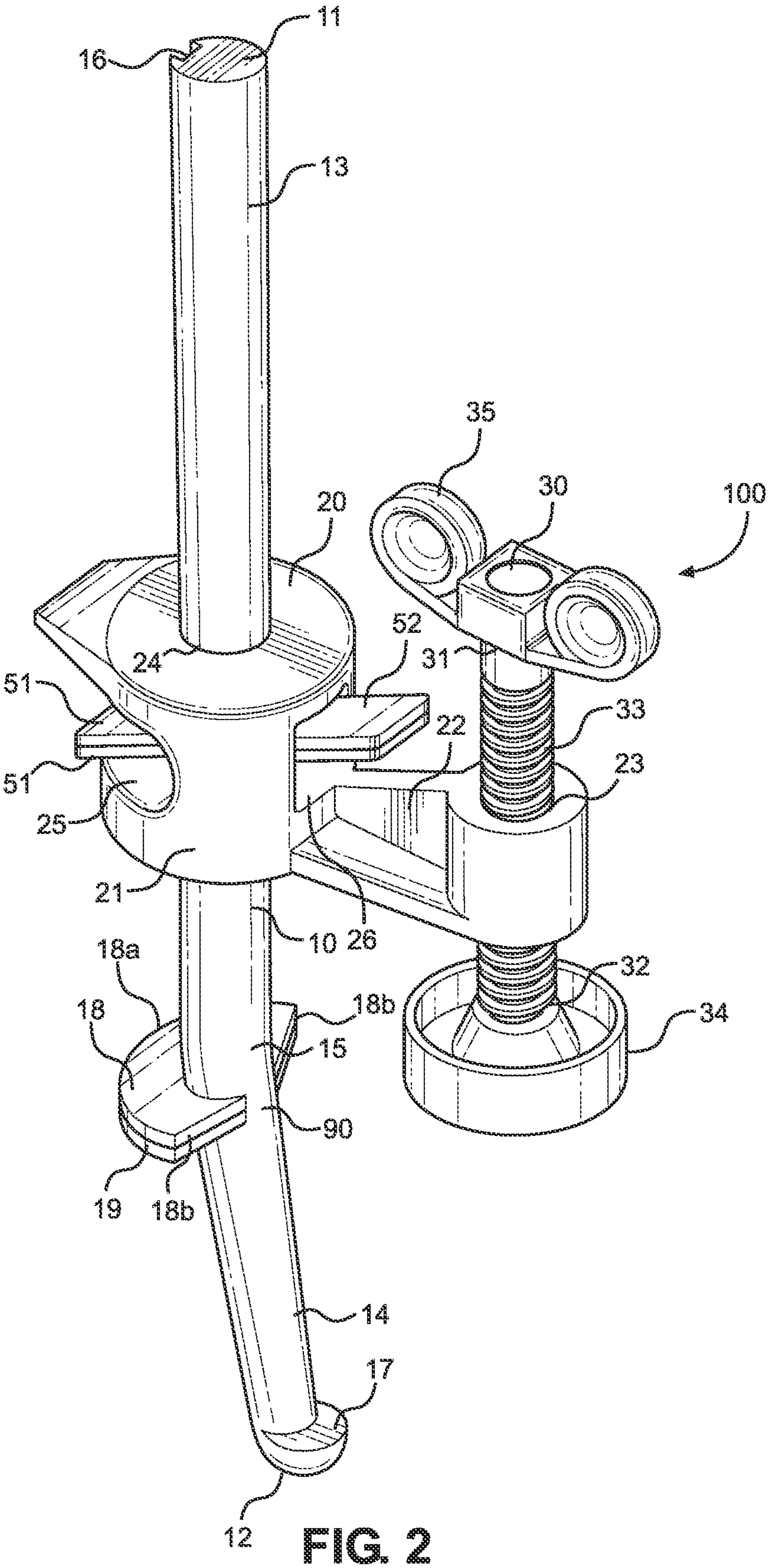
FIG. 2 depicts an overhead perspective view of the clamp assembly of the present invention.

FIG. 2 depicts a side perspective view of adjustable clamp assembly 100 of the present invention for securing an object (such as, for example, a board or other workpiece) to a work surface (such as, for example, an upper surface of a work bench or work table). In a preferred embodiment, said clamping assembly 100 of the present invention comprises a rigid central rod member 10 having upper or first end 11 and lower or second end 12.

Said rod member 10 further comprises substantially straight and cylindrical upper section 13 and a substantially straight and tapered lower section 14; bent section 15 is disposed between said upper section 13 and said lower section 14. Said bent section 15 can form a bend transition between substantially straight upper section 13 and substantially straight lower section 14. In a preferred embodiment, said bent section 15 forms an angle of approximately 12 degrees from vertical. However, it is to be observed that said angle can be greater or lesser, depending on various design considerations including, without limitation, the thickness of a workbench top.

In a preferred embodiment, upper section 13 has a substantially cylindrical shape with a substantially constant outer diameter. An elongated groove or channel 16 (only partially visible in FIG. 2) extends along a portion of said upper section 13 of central rod 10, and is aligned in substantially parallel orientation with the longitudinal axis of said upper section 13. Lower section 14 has a tapered diameter—that is, the outer diameter of said lower section 14 reduces or gets smaller in the direction of lower end 12 of rod 10. In a preferred embodiment, said lower end 12 of said tapered lower section 14 of rod 10 has a rounded, semi-spherical lower surface, as well as an upwardly-facing and substantially flat shoulder surface 17. Said upwardly facing shoulder surface 17 can generally have a demilune or substantially crescent shape.

A substantially planar support member 18 is disposed at or slightly below said bent section 15 of said rod member 10, and extends laterally outward from said rod member 10 (generally in opposing orientation from demilune surface 17). A non-abrasive cushioning (such as rubber or plastic) pad 19 is attached or otherwise disposed along the lower surface of planar support member 18. In a preferred embodiment, said support member 18 is fan shaped and does not completely encircle the outer surface of cylindrical rod 10; rather, outer circumferential surface 18*a* of planar support member 18 form an arc of approximately 180 degrees, with edges 18*b* of support member 18 oriented tangentially to rod 10.

Support member 18 is beneficially shaped so as to not completely encircle cylindrical rod member 10, thereby leaving a segment (by way of illustration, 25-30 degree of the arc of circumference of the cylindrical rod 10)—depicted as area 90 on FIG. 2—uncovered by said support member 18. Area 90 is generally aligned with demilune shoulder surface 17. This shape of support member 18 ensures that it will not interfere with placement of a workpiece, or risk damage to said workpiece, relative to central rod 10. Cushioning pad 19 can have substantially the same shape as support member 18.

Clamping member 20 is slidably disposed along the length of upper section 13 of central rod 10. Said clamping member 20 generally comprises a housing section 21, a lateral arm extension section 22, and a threaded bore 23 disposed at or near the distal or outer end of said arm extension section 22. Said housing 21 further comprises a central bore 24, while upper section 13 of cylindrical central rod 10 is slidably received in said bore 24. As such, it is to be observed that said clamping member 20 can move along the length of said upper section 13 of cylindrical central rod 10, and can be selectively secured in desired position(s) along said length of said upper section 13.

In a preferred embodiment, said clamping member 20 can be selectively locked in place along upper section 13 of central rod 10 using at least one clutch plate 50. As depicted in FIG. 2, each clutch plate 50 comprises a short tongue member 51 that protrudes toward one side of housing 21 through an opening 25 in said housing 20, and a long tongue member 52 that protrudes toward an opposite side of said housing 20 through an opposing opening 26 in said housing 20. A spring (not depicted in FIG. 2) biases said at least one clutch plate 50 against said central rod 10, thereby forming a selectively releasable frictional grip against said central rod 10.

A threaded bolt member 30 having an upper end 31 and a lower end 32 is threadedly disposed within said threaded bore 23 to form a vice member. A handle member 35 (such as, for example, a "thumb screw") is disposed at or near said upper end 31, while a foot pad 34 is disposed at or near said lower end 32. Said foot pad 34 is at least partially constructed of non-abrasive material (such as, for example, plastic, rubber or other beneficial material), and is permitted to swivel about the longitudinal axis of said threaded bolt member 30.

Although other configurations can be envisioned without departing from the scope of the present invention, in a preferred embodiment, said threaded bore 23 and threaded bolt member 30 have matching ACME (coarse) threads 33 that can engage with each other to selectively raise or lower bolt member 30 (and attached foot pad member 34) relative to said threaded bore 23 upon rotation of said bolt member within threaded bore 23. Said threaded bolt 30 travels in a direction that is generally parallel to the longitudinal axis of said rigid rod member 10. Said threads 33 can be either right-hand or left-hand threads depending on design or user preference.

Figure 3:
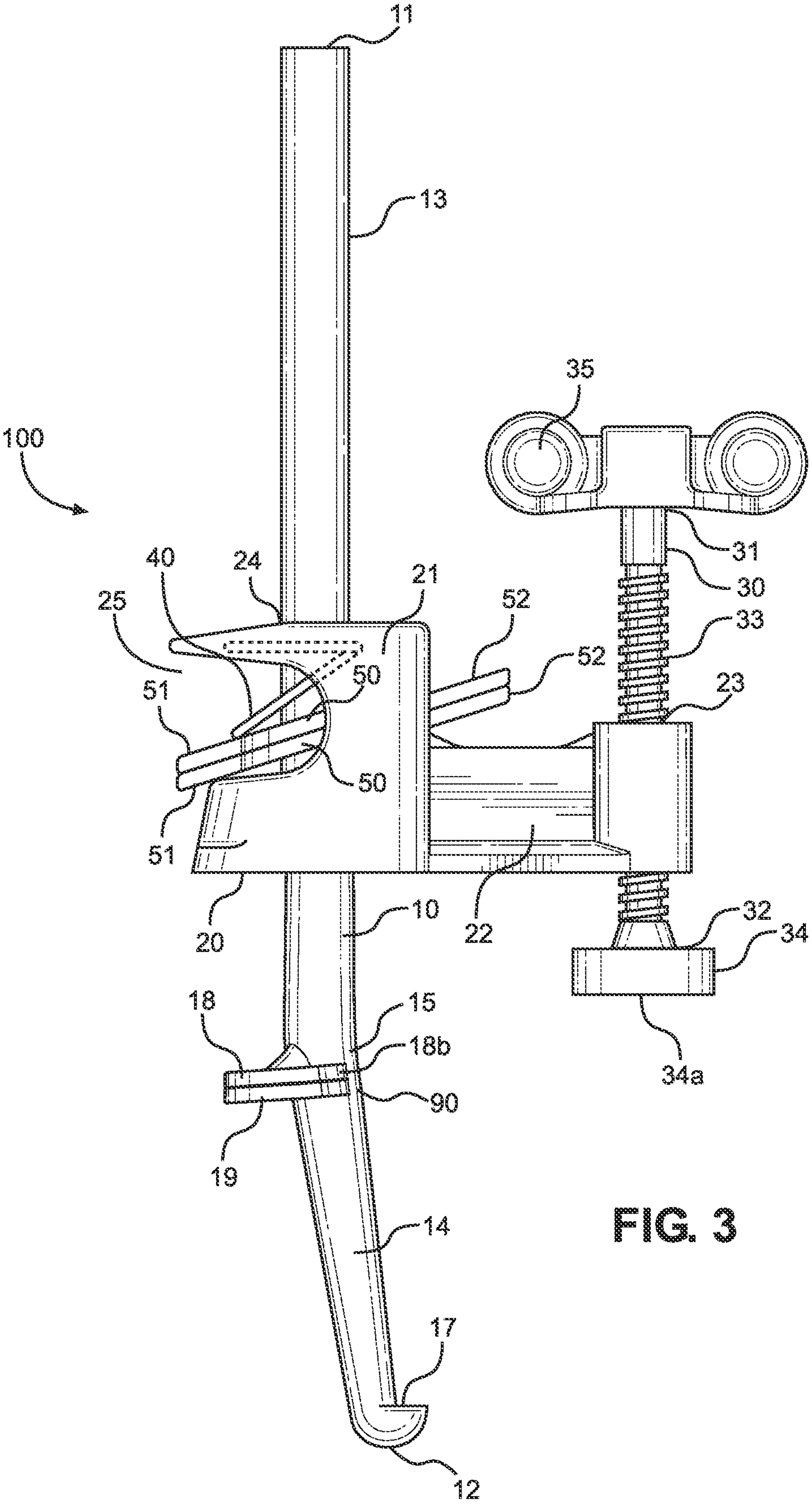
FIG. 3 depicts a side view of the clamp assembly of the present invention.
Figure 4:
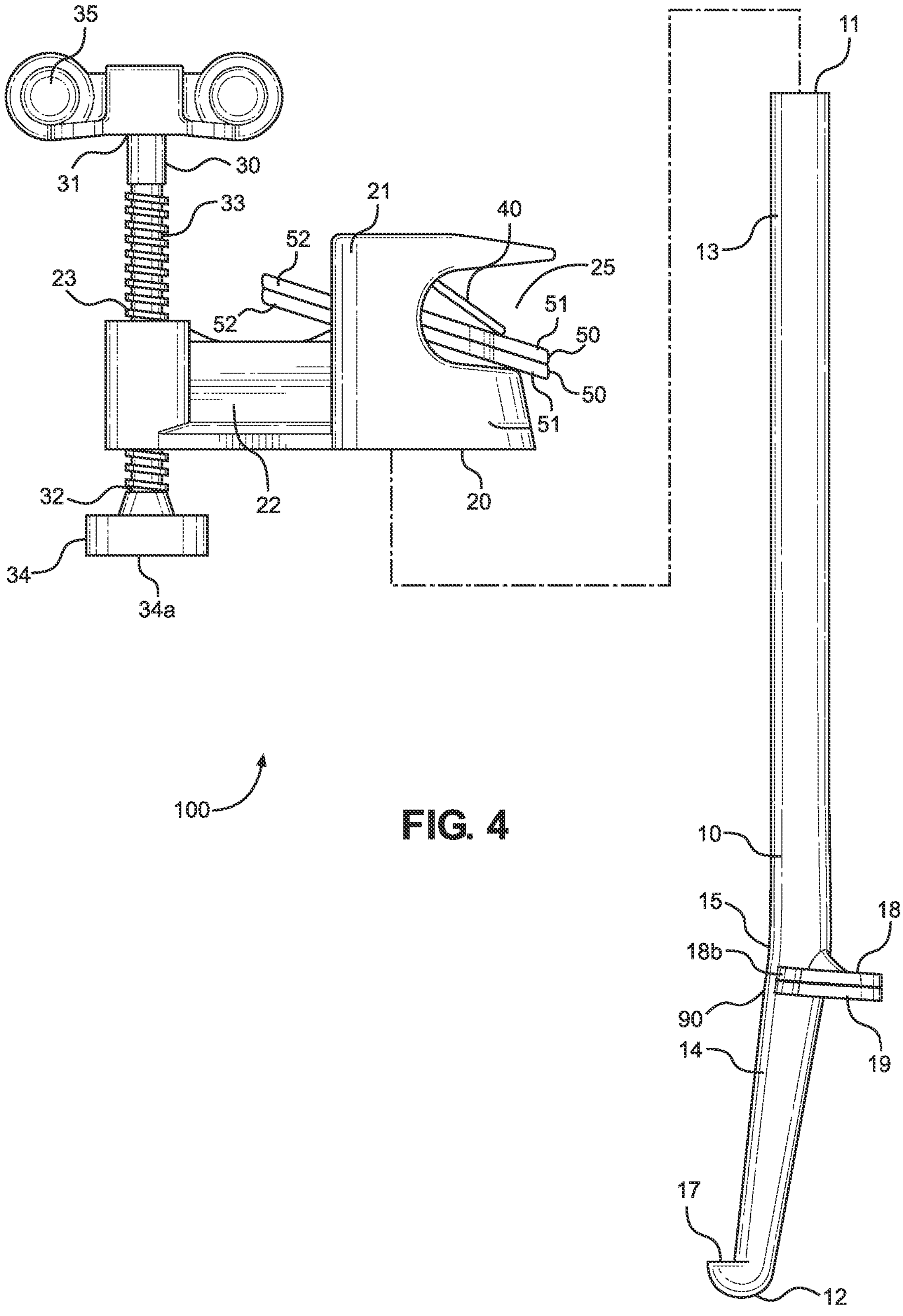
FIG. 4 depicts a side exploded view of the clamp assembly of the present invention.

FIG. 3 depicts a side view of the clamp assembly 100 of the present invention, while FIG. 4 depicts a side exploded view of said clamp assembly 100 rotated approximately 180 degrees from the view depicted in FIG. 3. Referring to FIGS. 3 and 4, rod member 10 comprises substantially straight and cylindrical upper section 13 having upper end 11, substantially straight and tapered lower section 14 having lower end 12, and bent section 15 disposed between said upper section 13 and lower section 14. In a preferred embodiment, said bent section 15 forms an angle of approximately 12 degrees from vertical; however, it is to be observed that said angle can be greater or less, depending on various design considerations including, without limitation, the thickness of a workbench top.

In a preferred embodiment, upper section 13 has a substantially cylindrical shape with a substantially constant outer diameter. Lower section 14 has a tapered diameter wherein the outer diameter of said lower section 14 reduces or gets smaller in the direction of lower end 12 of rod 10. In a preferred embodiment, said lower end 12 of said tapered lower section 14 of rod 10 has a semi-spherical and rounded bottom surface, as well as an upwardly-facing and substantially flat shoulder surface 17 having a demilune or substantially crescent shape.

Substantially fan-shaped planar support member 18 is disposed at or slightly below said bent section 15 of said rod member 10, and extends laterally outward from said rod member 10, generally in opposing relationship to rod member 10 from upwardly-facing shoulder 17. Non-abrasive cushioning (such as rubber or plastic) pad 19 is attached or otherwise disposed along the lower surface of planar support member 18. Edges 18*b* of support member 18 are oriented tangentially to rod 10, such that support member 18 does not completely surround rod member 10; support member 18 is beneficially shaped so as to not completely encircle cylindrical rod member 10, thereby leaving section 90 (by way of illustration, 25-30 degree of the arc of circumference of the cylindrical rod 10) uncovered by said support member 18.

Clamping member 20 comprises a housing section 21, a lateral arm extension section 22, and a threaded bore 23 disposed at or near the distal or outer end of said arm extension section 22. Said housing section 21 has a central bore 24 extending through said housing section 21 (best seen in FIG. 2). Upper section 13 of cylindrical central rod 10 is slidably received in said central bore 24. As such, it is to be observed that said clamping member 20 can move along the length of said upper section 13 of cylindrical central rod 10, and can be selectively secured in a desired position on said upper section 13. In a preferred embodiment, said clamping member 20 can be selectively locked in place along upper section 13 of central rod 10 using at least one clutch plate 50 and bias spring 40.

Figure 7:
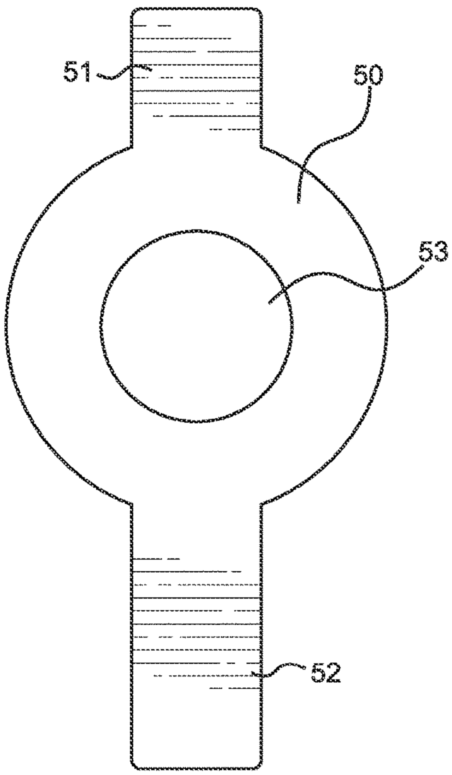
FIG. 7 depicts an overhead view of a clutch plate of the present invention.
Figure 7A:
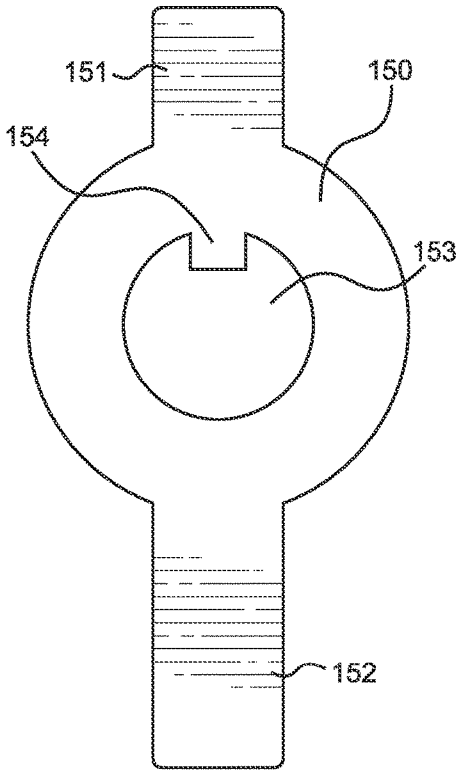
FIG. 7A depicts an overhead view of an alternative embodiment clutch plate of the present invention.

FIG. 7 depicts an overhead view of a clutch plate 50 of the present invention. Said clutch plate 50 generally comprises a substantially circular body section having a central bore 53. Long tongue 52 and short tongue 51 extend from said body member. Said long tongue 52 and short tongue 51 are in substantially linear alignment, such that said tongue members are phased approximately 180 degrees apart along the outer edges of said central body member. FIG. 7A depicts an overhead view of an alternative embodiment clutch plate 150 of the present invention. Said alternate embodiment clutch 150 plate is substantially identical to clutch plate 50 depicted in FIG. 7, except that it also includes a tooth member 154 (linearly aligned with tongues 152 and 151) that extends into central bore 153.

Referring back to FIGS. 3 and 4, short tongue members 51 can protrude toward one side of housing 21 through an opening 25 in said housing 20, while long tongue members 52 can protrude generally in the direction of arm extension 22 through an opposing opening 26 (not visible in FIGS. 3 and 4, but visible in FIG. 2) in housing 21. Referring to FIG.

3, spring 40 acts to bias said at least one clutch plate 50 against the outer surface of said central rod 10, thereby forming a frictional gripping force between said clutch plate(s) 50 and said central rod 10.

Said clamping member 20 can be selectively secured along the length of upper section 13 of central rod 10 by manually depressing said long tongue(s) 52 in order to overcome force exerted by said bias spring 40, and thereby releasing said at least one clutch plate 50 from a frictional "bind" or gripping force exerted against said central rod 10. With said gripping force relieved, said clamping member 20 (and, more specifically, housing 21 thereof) can then be selectively repositioned along the length of upper section 13 said central rod 10.

Following such selective (re-)positioning, said clamping member 20 can then be secured in place along said upper section 13 by releasing said long tongue(s) 52, and permitting said spring 40 to again bias said at least one clutch plate 50 against central rod 10, thereby causing said clutch plate(s) 50 to reengage with said central rod 10. Put another way, depressing long tongue(s) 52 disengages the inner surfaces of clutch plate(s) 50 from the outer surface of upper section 13 of central rod 10, thereby allowing housing 20 (and all attached accessories) to slide along the longitudinal axis of central rod 10. Clutch plates 50 are reengaged with the central rod 10 by bias force from spring 40 when long tongue(s) 52 are released.

Threaded bolt member 30 having an upper end 31 and a lower end 32 is threadedly disposed within said threaded bore 23. Handle member 35 is disposed at or near said upper end 31, while foot pad 34 is disposed at or near said lower end 32. Said foot pad 34 can be at least partially constructed of non-abrasive material (such as, for example, plastic, rubber or other beneficial material), can have a substantially flat lower surface 34*a*, and is permitted to swivel about the longitudinal axis of said threaded bolt member 30. A universal joint mechanism can be installed between said foot pad 34 and lower end 32 of threaded bolt member 30. Threaded bore 23 and threaded bolt member 30 have threads 33 that can engage with each other to selectively move bolt member 30 (and attached foot pad member 34) relative to said threaded bore 23 upon rotation of bolt member 30 about its longitudinal axis.

Figure 5:
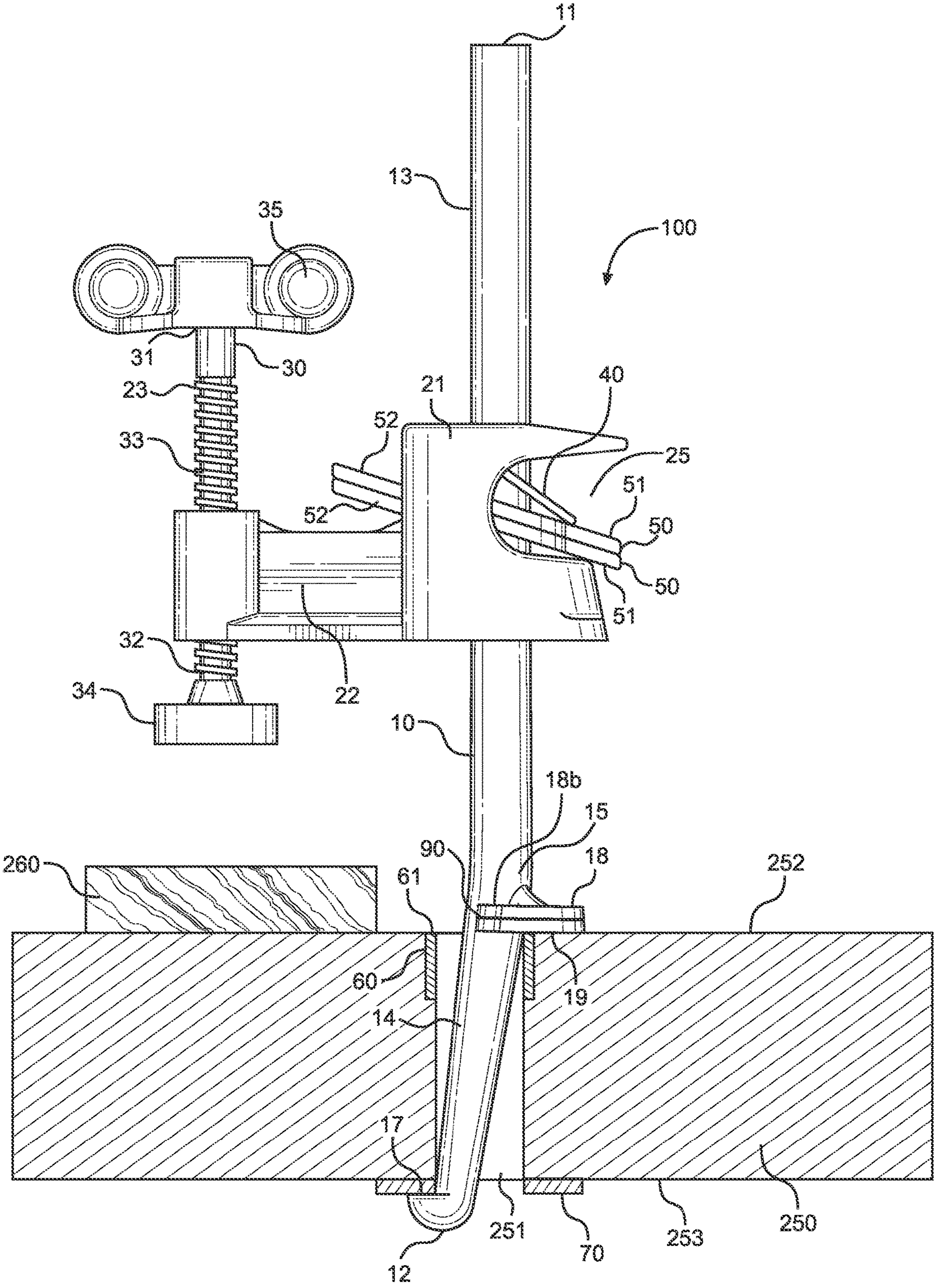
FIG. 5 depicts a side view of the clamp assembly of the present invention during positioning relative to a work piece on a work bench.

FIG. 5 depicts a side view of the clamp assembly of the present invention being positioned in relationship to a work piece 260 disposed on upper surface 252 of work bench 250. As is common in many fields, including woodworking, a workbench 250 having upper work surface 252 can be used to support and stabilize a workpiece 260 in order to facilitate a task (such as, for example, performing work on said workpiece 260). Such a workbench 250, when used for woodworking, traditionally has a large, heavy, dense and thick top which can be bored through with many transverse holes, commonly referred to as "dogholes" 251.

Work bench tops commonly have many dogholes 251. Although particular dimensions and configurations can vary, a doghole is usually ¾" in diameter and through-drilled in perpendicular orientation to upper surface 252 of workbench 250. A conventional doghole is usually just a plain hole without any additions, attachments or modifications. By contrast, in a preferred embodiment, the present invention can comprise a bushing 60, a washer 70, or combinations thereof; said bushing 60 and/or washer 70 can be permanently attached to a workbench 250 during initial fabrication, or retrofitted to an existing workbench.

Bushing 60 can be fabricated of any strong durable material, preferably metal. In a preferred embodiment, said bushing 60 has an inner diameter (ID) that is the same as the ID of a corresponding doghole. By way of illustration, but not limitation, the wall of bushing 60 can preferably be ⅛" thick or other desired thickness, while the outer diameter (OD) of bushing 60 is preferably approximately 1" or other desired thickness. Upper edge 61 of bushing 60 is beneficially level or flush with upper surface 252 of doghole 251. Further, bushing 60 is concentric with doghole 251, and can be secured in place with a chemical or other adhesive, such as epoxy glue or the like. Said bushing 60 acts to shield the inner surface of doghole 251 from erosive wear, thus insuring that said doghole 251 is not enlarged with use, while also distributing the forces generated with normal use over a greater area of said inner surface of doghole 251.

Washer 70, which is also preferably metallic, has an ID that is the same as doghole 251, and an OD that is larger than said doghole 251. In a preferred embodiment, the ID of washer 70 is ¾ inch (to match the diameter of doghole 251 depicted in FIG. 5); thus, the OD of washer 70 can preferably be approximately 2¼ inches or more, with a thickness of at least 3/16 inches. However, it is to be understood that these dimensions are illustrative only, and are not limiting in any manner.

Figure 10:
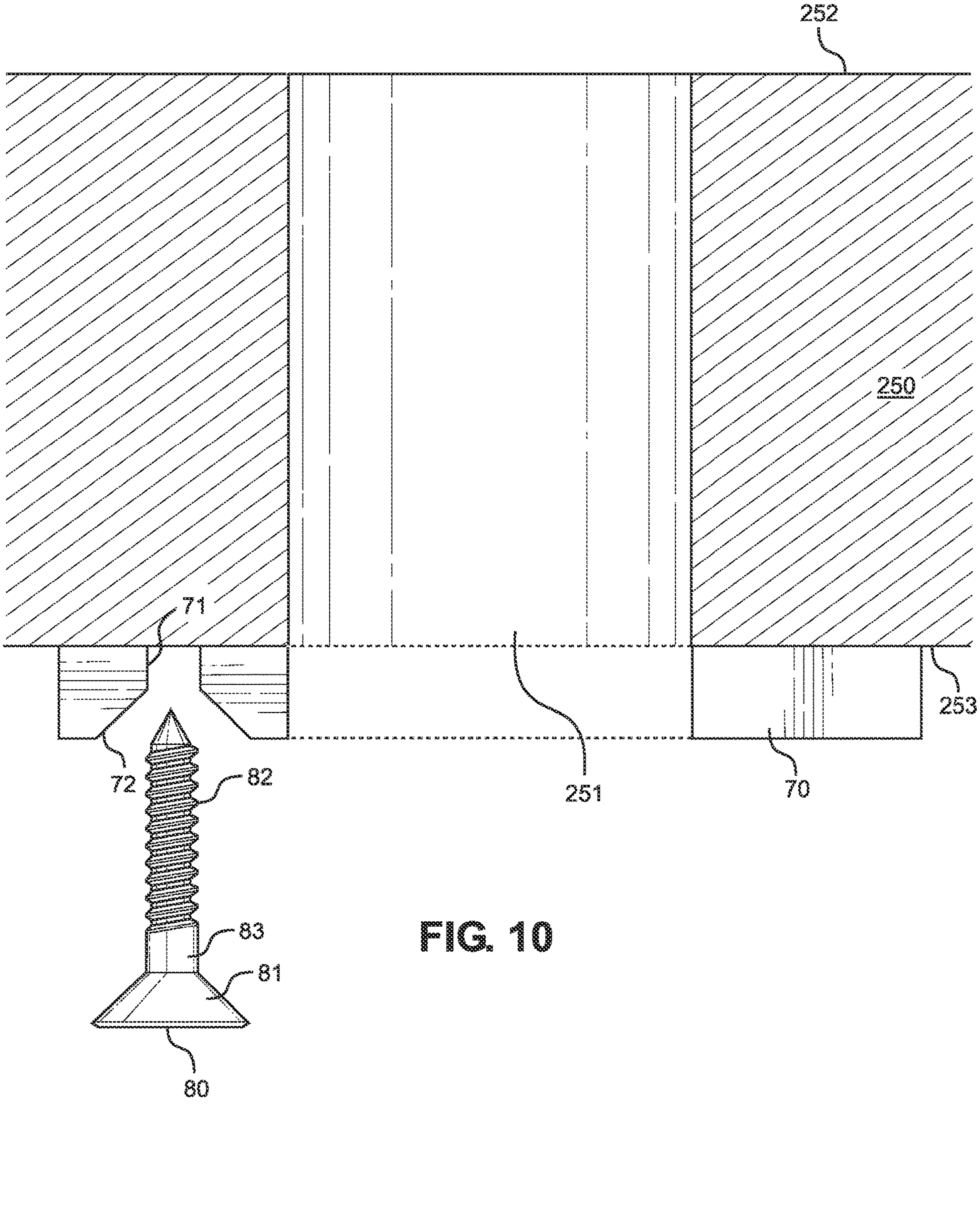
FIG. 10 depicts a side sectional and partially exploded view of a washer member of the present invention.

FIG. 10 depicts washer 70 comprising a plurality of counter sunk screw holes, each such screw hole further comprising a beveled level 72 and a cylindrical portion 71. A screw 80 having head 81, threads 82 and unthreaded portion 83 (having the same OD as the ID of cylindrical portion 71 of screw hole of washer 70) can be received in each screw hole of washer 70; when so installed, said screw 80 does not extend beyond the thickness (that is, the bottom-facing surface) of washer 70. When screw 80 is completely received within countersink bores 71 and 72, the OD of unthreaded section 83 of screw 80 matches the ID of cylindrical section 71, thereby ensuring that washer 70 will remain concentric with doghole 251, resisting any lateral or rotational displacement during use.

Referring back, FIG. 5 depicts a side view of clamp assembly 100 of the present invention during positioning of said clamp assembly 100 relative to a work piece 260 on a work bench 250. In operation a board or other workpiece 260 can be selectively positioned on upper surface 252 of a workbench 250 and within a desired distance away from a doghole 251. Lower section 14 and rounded bottom surface 12 of rigid rod member 10 is inserted through doghole 251 and manipulated until upwardly facing demilune surface 17 engages in opposing relationship against washer 70, attached to the underside 253 of workbench 250. Because of bent section 15, as well as the taper of section 14, said lower section 14 can be "skewed" or laterally displaced so that it is not in axial alignment with the longitudinal axis of doghole 251, thereby allowing demilune surface 17 to contact and engage against the underside of washer 70.

Still referring to FIG. 5, after manipulating demilune surface 17 to a position below washer 70, upper section 13 of rigid rod member 10 is essentially positioned in an orientation that is substantially perpendicular to planar upper surface 252 of workbench 250 (and parallel to the longitudinal axis of doghole 251) while the long axis of tapered section 14 is "skewed"—that is, oriented out of parallel with the longitudinal axis of doghole 251. Washer 70 allows for 360-degree rotation of tapered lower section 14 of central rod 10, with its bottom 12 and upwardly-facing demilune shoulder surface 17, below the bottom of washer 70 without interference from any countersunk screw(s).

Clamping member 20 can be selectively positioned and secured in place at practically any desired vertical location along the length of upper section 13 using clutch plates 50. Specifically, long tongue(s) 52 of clutch plates(s) 50 can be depressed in order to overcome force exerted by bias spring 40, thereby releasing said at least one clutch plate 50 from a frictional "bind" or gripping force exerted against said central rod 10. With said gripping force relieved, said clamping member 20 can then be selectively repositioned along the length of upper section 13 of said central rod 10. After such selective (re-)positioning, said clamping member 20 can then be secured in place along said upper section 13 by releasing said long tongue(s) 52, and permitting said spring 40 to bias said at least one clutch plate 50, thereby causing said clutch plate(s) 50 to reengage with said central rod 10.

Figure 6:
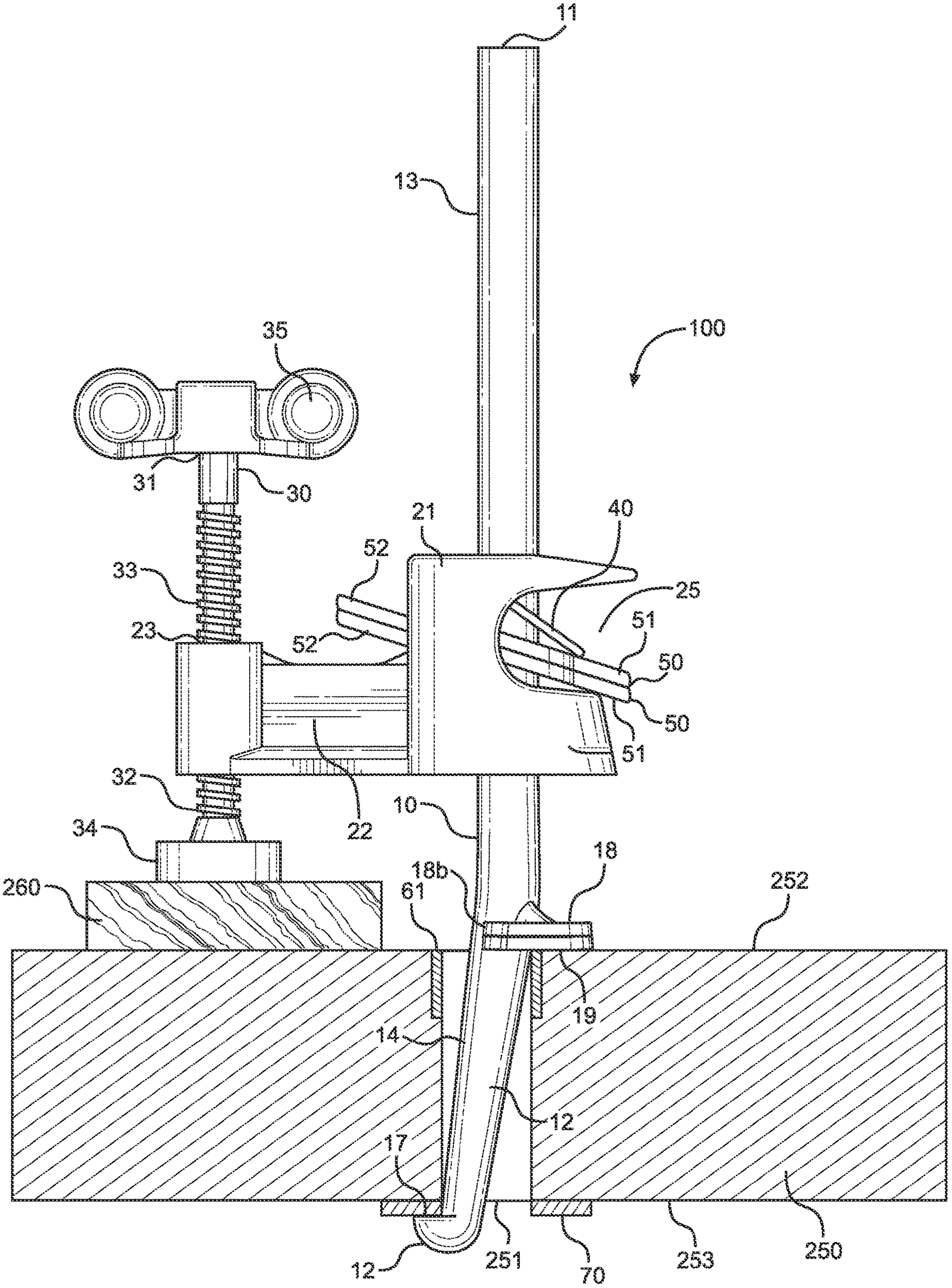
FIG. 6 depicts a side view of the clamp assembly of the present invention being used to clamp a work piece against a work bench.

FIG. 6 depicts a side view of said clamp assembly 100 being used to clamp/secure work piece 260 against upper surface 252 of work bench 250, wherein clamping member 20 has been selectively positioned and secured in place nearer to workbench 250 than the position depicted in FIG. 5. Thereafter, threaded bolt 30 can be rotated within threaded bore 23 by turning thumbscrew 35, causing said bolt 30 to travel axially downward until foot pad 34 contacts workpiece 260. Said bolt 30 can be selectively tightened like a vice until a desired amount of force (pressure) is applied to workpiece 260 by said foot pad 34. In this manner, said workpiece 260 is secured against axial and lateral movement, or undesired repositioning, allowing a user to work on or otherwise manipulate said workpiece 260 reliably, more quickly and with enhanced safety.

Still referring to FIG. 6, washer 70 serves to provide a durable, essentially indestructible, surface below bottom surface 253 of workbench 250 against which demilune surface 17 can be placed to facilitate anchoring central rod 10 vertically so it resists displacement when a workpiece 260 is secured in place against the upper surface 252 of said workbench 250. Washer 70 also distributes the upward force acting on the lower surface 253 of workbench 250 over a greater area, so as to eliminate damage to said workbench 250 during use, thus ensuring trouble free service.

The aforementioned clamping process can be quickly and efficiently performed in a matter of seconds. A user is not required to deliver a blow to the top of the clamp assembly using a mallet or other heavy object to set or release the clamp assembly. Further, the user is not required to tighten a screw to increase friction or reach below a workbench top to fumble with a large threaded bolt in order to secure the clamp. A quick manipulation of the clamp assembly positions demilune surface 17 below washer 70. Thereafter, a quick adjustment of the vertical position of the clamp member 20 and a few twists of thumbscrew 35 anchors said demilune surface 17 against washer 70, and then applies needed force to secure workpiece 260. As such, clamping assembly 100 of the present invention can be quickly safely and efficiently deployed and removed, as well as tightened and loosened. Said clamping assembly 100 permits 360 degree rotational movement within doghole 251, thereby permitting the said clamping assembly to be used in virtually any radial direction relative to said doghole 251.

Figure 8:
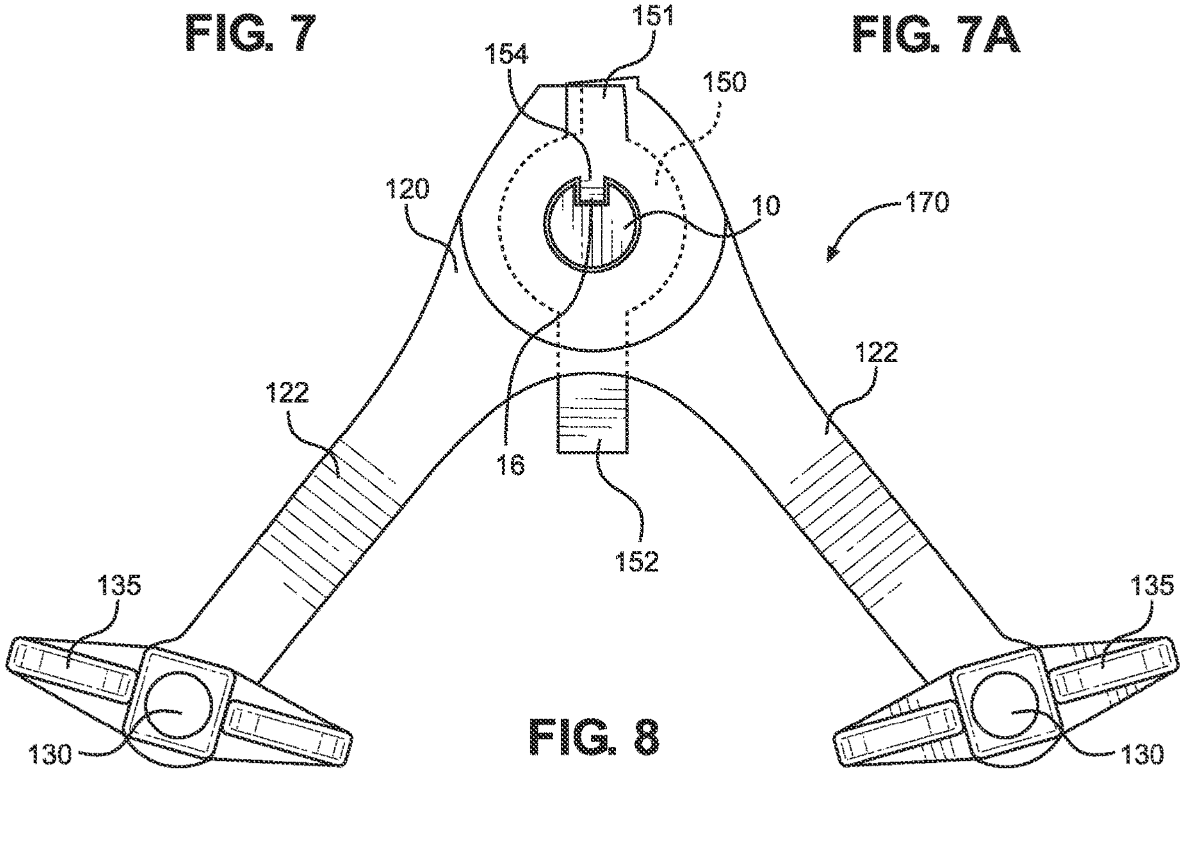
FIG. 8 depicts a top view of an alternative embodiment clamp assembly of the present invention.

FIG. 8 depicts a top view of an alternative embodiment clamp assembly of the present invention comprising clamping member 120 having two extension arm sections 122 and two bolts 130; each of said bolts 130 is equipped with a thumb screw 135. Clamping member 120 is slidably disposed on—and can be selectively positioned and secured in place along the length of—central rod 10 using clutch plate(s) 150. In the embodiment depicted in FIG. 8, tooth member 154 of each clutch plate(s) 150 is received within elongated groove 16 in central rod 10. Said tooth member 154 prevents said clamping member 120 from rotating around the longitudinal axis of central rod 10 (effectively fixing the radial orientation of extension arms 122 relative to central rod 10).

In the embodiment depicted in FIG. 8, said extension arms 122 extend radially outward from housing 120 and are spaced apart at substantially a right angle relative to each other. In many applications, a workpiece can be secured more effectively from two locations with essentially a doubled combined downward clamping force. In some applications, alternative clamp assembly 170 with this embodiment, using only one doghole for anchorage, could replace two or more conventional clamps.

Figure 9:
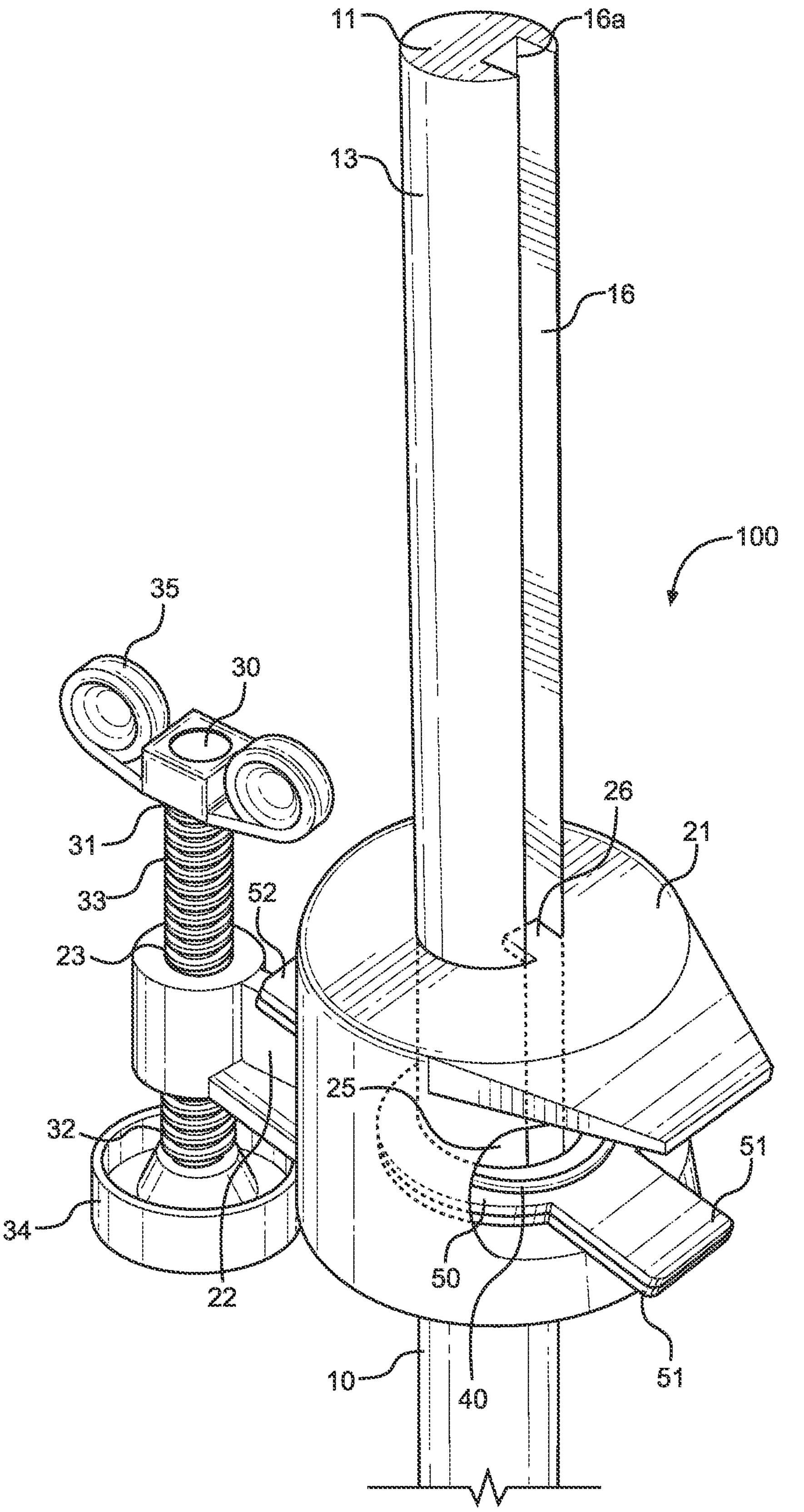
FIG. 9 depicts a detailed view of a portion of the clamp assembly of the present invention.

FIG. 9 depicts a detailed view of a portion of clamp assembly 100 of the present invention. Elongated groove 16 extends along the length of at least a portion of central rod 10. In a preferred embodiment, said groove 16 has no superior lateral (upper) wall, leaving the upper end of the groove open to facilitate assembly and disassembly of the apparatus and, more specifically, removal of housing 21 from said central rod 10. The bottom end of said groove 16 can beneficially have a solid wall surface.

Still referring to FIG. 9, said housing 20 can further comprise at least one tooth 26 that protrudes inward from said housing and is slidably received in elongate groove 16 in said cylindrical central rod 10. In a preferred embodiment, said housing has two such teeth that are fixedly placed, one tooth 26 above and one tooth below (not shown in FIG. 9) at least one clutch plate 50. Said teeth 26 function to keep the clamping member 20 from rotating around the outer circumference of central rod 10, and thereby maintaining the rotational orientation of clamping member 20 (including, without limitation, said housing and at least one clutch plate) relative to central rod 10. An additional function of said at least one tooth lower tooth positioned below said at least one clutch plate 50 is to limit downward movement of clamping member 20 along the length of central rod 10 by engaging the inferior/lower wall of groove 16.

It is to be observed that at least one alternative clutch plate 150, each having a forward protruding tooth 154 could also be used for this purpose. Said tooth (or teeth) 154 would be aligned vertically with teeth 26 disposed on the inner diameter of housing 21, and would also protrude into groove 16 in central rod 10, and would be disposed between the two housing teeth 26. In such a case, each tooth 154 would function in harmony with housing teeth 26; or tooth 154 could also replace the housing teeth 26 and function alone without diminishing the function of stabilizing housing 20 rotationally around central rod 10 and limiting the downward vertical movement of housing 20 along central rod 10.

As stated earlier, the teeth and groove provided in the present invention insure that the clamping device rotates in the doghole as a unit. This, combined with the straight forward direction of the bend in the central rod, insures that the demilune surface 17 will always stay engaged below washer 70 during use. Referring to FIGS. 5 and 6, it is to be observed that demilune surface 17 and the swivel foot pad 34 are in the same vertical plane, and this relationship never changes during normal use. Therefore, the demilune surface 17 will never become disengaged from below washer 70 during normal use.

The above-described invention has a number of particular features that should preferably be employed in combination, although each is useful separately without departure from the scope of the invention. While the preferred embodiments of the present invention are shown and described herein, it will be understood that the invention may be embodied otherwise than herein specifically illustrated or described, and that certain changes in form and arrangement of parts and the specific manner of practicing the invention may be made within the underlying idea or principles of the invention. Dimensions and material selections are illustrative only, and are not intended to be, and should not be construed as, limiting in any manner.

What is claimed:

1. A method for clamping a workpiece to a work bench having an upper work surface and a lower surface, comprising:
  a) providing a clamp apparatus comprising:
    i) an elongate cylindrical rod having a substantially flat shoulder surface disposed at the distal end of said elongate cylindrical rod, wherein said substantially flat shoulder surface is oriented substantially parallel to said lower surface of said work bench;
    ii) a clamp member having a bore, wherein said elongate rod is slidably received within said bore, and wherein a portion of said elongate rod is configured to be received within a hole in a work surface;
    iii) a locking assembly for selectively securing said clamp member in a desired position along the length of said elongate rod;
    iv) a vice assembly operationally attached to said clamp member, wherein said vice assembly is configured to selectively apply force to a workpiece to secure said workpiece to said upper work surface;
  b) inserting said lower section of said elongate rod into a hole extending through said work bench;
  c) engaging said substantially flat shoulder surface of said elongate rod against said lower surface of said work bench;
  d) moving said clamp member to a desired location along the length of said elongate rod and securing said clamp member from movement relative to said elongate rod; and
  e) engaging said vice assembly against said workpiece to selectively apply force to said workpiece to secure said workpiece to said upper work surface.

2. The method of claim 1, wherein said substantially flat shoulder has a demilune shape.

3. The method of claim 1, wherein said work bench further comprises a metallic bushing installed within at least a portion of said hole extending through said work bench.

4. The method of claim 1, wherein said work bench further comprises a washer disposed around said hole under said work surface.

5. The method of claim 1, wherein said clamp apparatus further comprises:
  a) an elongate channel disposed along at least a portion of said length of said elongate rod; and
  b) a tooth member extending from said clamp member, wherein said tooth is slidably received in said elongate channel, and is configured to prevent said clamp member from rotating around said central rod.

6. The method of claim 1, wherein said elongate cylindrical rod has an upper section, a lower section and a bent section between said upper and lower sections.

7. The method of claim 6, wherein said lower section has a smaller diameter than said upper section.

8. A method for clamping a workpiece to a work bench having an upper work surface and a lower surface, comprising:
  a) providing a clamp apparatus comprising:
    i) an elongate rod having an upper end, a lower end, a length, a width and a substantially flat shoulder surface disposed at said lower end, wherein said substantially flat shoulder surface is oriented substantially parallel to said lower surface of said work bench;
    ii) a clamp member having a bore, wherein said elongate rod is slidably received within said bore, and wherein a portion of said elongate rod is configured to be received within a hole in a work surface;
    iii) a locking assembly for selectively securing said clamp member in a desired position along the length of said elongate rod;
    iv) a vice assembly operationally attached to said clamp member, wherein said vice assembly is configured to selectively apply force to a workpiece to secure said workpiece to said upper work surface;
  b) inserting said lower section of said elongate rod into a hole extending through said work bench;
  c) engaging said substantially flat shoulder surface of said elongate rod against said lower surface of said work bench;
  d) moving said clamp member to a desired location along the length of said elongate rod and securing said clamp member from movement relative to said elongate rod; and
  e) engaging said vice assembly against said workpiece to selectively apply force to said workpiece to secure said workpiece to said upper work surface.

9. The method of claim 8, wherein said width of said elongate rod is greater at said first end than at said second end.

10. The method of claim 8, wherein said substantially flat shoulder has a demilune shape.

11. The method of claim 8, wherein said work bench further comprises a metallic bushing installed within at least a portion of said hole extending through said work bench.

12. The method of claim 8, wherein said work bench further comprises a washer disposed around said hole under said work surface.

13. The method of claim 12, wherein said clamp apparatus further comprises:
  a) an elongate channel disposed along at least a portion of said length of said elongate rod; and
  b) a tooth member extending from said clamp member, wherein said tooth is slidably received in said elongate channel, and is configured to prevent said clamp member from rotating around said central rod.

14. A method for clamping a workpiece to a work bench having an upper work surface and a lower surface, comprising:
  a) providing a clamp apparatus comprising:
    i) an elongate rod having an upper end, a lower end and a substantially flat shoulder surface disposed at said lower end, wherein said substantially flat shoulder surface is oriented substantially parallel to said lower surface of said work bench;
    ii) a clamp member having a bore, wherein said elongate rod is slidably received within said bore;
    iii) a locking assembly for selectively securing said clamp member in a desired position along the length of said elongate rod;
    iv) a vice assembly operationally attached to said clamp member;
  b) inserting said lower section of said elongate rod into a hole extending through said work bench;

c) engaging said substantially flat shoulder surface of said elongate rod against said lower surface of said work bench;

d) moving said clamp member to a desired location along the length of said elongate rod and securing said clamp member from movement relative to said elongate rod; and e) engaging said vice assembly against said workpiece to selectively apply compressive force to said workpiece to secure said workpiece to said upper work surface.

15. The method of claim 14, wherein said width of said elongate rod is greater at said first end than at said second end.

16. The method of claim 14, wherein said substantially flat shoulder has a demilune shape.

17. The method of claim 14, wherein said work bench further comprises a metallic bushing installed within at least a portion of said hole extending through said work bench.

18. The method of claim 14, wherein said work bench further comprises a washer disposed around said hole under said work surface.

* * * * *